May 29, 1928.
A. LENNING
1,671,949
RECTIFYING AND CONDENSING APPARATUS FOR REFRIGERATION
Filed Jan. 20, 1927
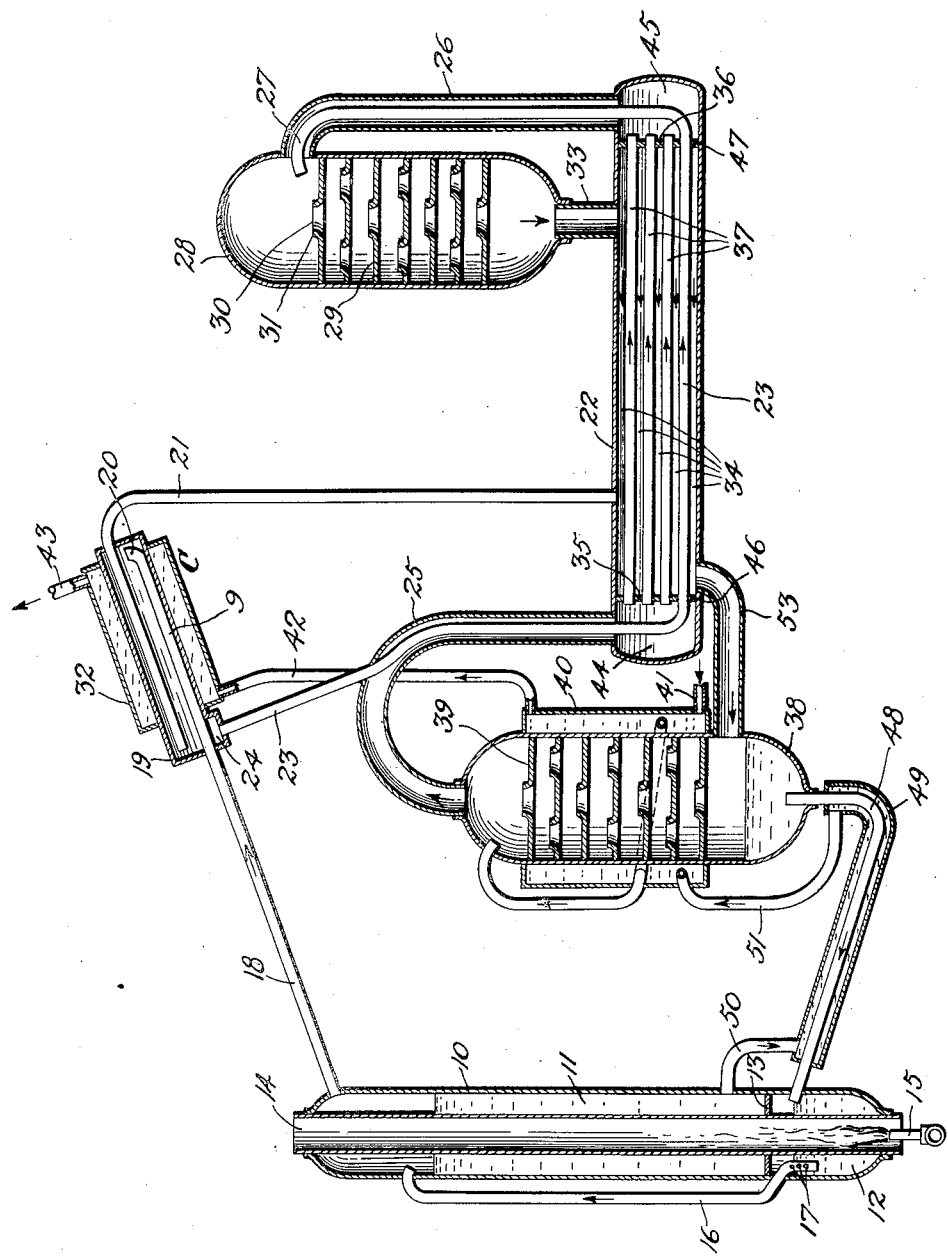
INVENTOR
Alvar Lenning
BY
Wm J. Hedlund
his ATTORNEY Patented May 29, 1928.

1,671,949

UNITED STATES PATENT OFFICE.

ALVAR LENNING, OF BROOKLYN, NEW YORK, ASSIGNOR TO ELECTROLUX SERVEL CORPORATION, OF NEW YORK, N. Y., A CORPORATION OF DELAWARE.

RECTIFYING AND CONDENSING APPARATUS FOR REFRIGERATION.

Application filed January 20, 1927. Serial No. 162,220.

My invention relates to the art of refrigeration and particularly to refrigerating apparatus of the absorption type.

The object of my invention is to provide a novel, simplified, highly efficient and unified combination of rectifier and condenser.

The figure shows an elevational, cross-sectional view of apparatus included in an absorption system and including my improved rectifier-condenser.

Reference character 10 designates a generator which is divided, by the partition 13, into two parts, a main generator 11 and an auxiliary generator 12. A flue 14 extends centrally through both auxiliary generator 12 and main generator 11. A suitable source of heat, as for example, the gas burner 15, is located below, and may extend partly within, flue 14. A thermo-siphon conduit 16 establishes communication between auxiliary generator 12 and main generator 11. The lower end of conduit 16 extends for some distance downwardly within auxiliary generator 12. The downwardly extending portion of conduit 16 is provided with one or more capillary ports 17.

A conduit 18 communicates with the upper part of main generator 11 and extends, inclined to the horizontal, upwardly to within the rectifier-condenser, designated generally by C. Rectifier-condenser C is likewise inclined to the horizontal upwardly and consists of an outer cylindrical member 19 and an inner conduit 9, which conduit 9 is a continuation of conduit 18. Outer member 19 is surrounded by a water jacket 32. Conduit 9 is, throughout the greater part of its length, in contact with, or very close to, the lower surface of member 19 and is so arranged that liquid ammonia passing downwardly through member 19 will come in contact with the outside of conduit 9. The end of conduit 9 within the upper end of member 19 extends nearly vertically for a short distance, as is shown at 20. A conduit 21 communicates with the opposite end of member 19 and extends upwardly therethrough and thence downwardly to communicate with heat exchanger 22. A conduit 23 communicates with a well 24 formed at the lowest part of member 19. Conduit 23 extends downwardly and within conduit 25, horizontally within heat exchanger 22, upwardly within conduit 26, and ends in the form of a gooseneck bend 27 within evaporator 28 which is within the space to be cooled.

Evaporator 28 is a cylindrical member closed at its upper end and supplied with a series of disks 29. Disks 29 are provided with apertures 30 which are surrounded by raised rings 31. The purpose of these disks is to collect shallow pools of liquid ammonia thereon and thus allow the ammonia to come in intimate contact with an inert gas for purposes to be explained later. A conduit 33 provides a passageway from the lower part of evaporator 28 to space 34 within heat exchanger 22.

Space 34 is formed within heat exchanger 22 between tube heads 35 and 36 and around tubes 37 and conduit 23. A conduit 53 connects space 34 with the lower part of absorber 38. Absorber 38 is a cylindrical member within which is placed a series of disks 39 which may be similar to disks 29 in evaporator 28. Absorber 38 is partly surrounded by a water jacket 40. Cooling water is admitted to water jacket 40 through a conduit 41 and is discharged through a conduit 42 to water jacket 32 and is finally discharged through a conduit 43.

Conduit 25 connects the upper part of absorber 38 with space 44 formed within heat exchanger 22 between tube head 35 and the adjacent end of the heat exchanger. Tubes 37 establish communication between space 44 and space 45. Space 45 is formed within heat exchanger 22 between tube head 36 and the adjacent end of the heat exchanger. Tube heads 35 and 36 are provided with capillary passageways 46 and 47 respectively. Conduit 26 connects space 45 with the upper part of evaporator 28.

A conduit 48 communicates with the bottom of absorber 38 and the upper part of auxiliary generator 12 and passes within a heat exchanger 49. A conduit 50 connects the lower part of main generator 11 with one end of heat exchanger 49. A conduit 51 connects the other end of heat exchanger 49 with the upper part of absorber 38 and passes within water jacket 40.

The operation of the apparatus is described in the following paragraphs:

A solution consisting of a refrigerant, for instance ammonia, dissolved in an absorbing medium, for instance water, is contained within main generator 11. The application of heat from gas burner 15 serves to drive the ammonia out of solution and it passes as a vapor upwardly from main generator 11 through conduit 18. A small amount of water is also vaporized and passes through conduit 18 with the ammonia vapor. The mixture of ammonia and water vapor passes from conduit 18 through conduit 9 within rectifier-condenser C and the water vapor is condensed in conduit 9, as will be explained presently, and runs back through conduits 9 and 18 to main generator 11. The dry ammonia vapor passes from conduit 9 into outer conduit 19 where it is condensed to a liquid by the cooling action of the cooling water in water jacket 32. The liquid ammonia passes downwardly in the bottom of outer conduit 19 and in contact with the exterior of inner conduit 9. As the boiling point of ammonia is lower than that of water at the same pressure, the liquid ammonia around conduit 9 is at a temperature below that at which the water vapor within conduit 9 will condense. Hence the liquid ammonia absorbs heat from the water vapor and causes it to condense to a liquid. The liquid ammonia in conduit 19 is at a temperature but very slightly below its boiling point, and such an equalization of temperatures between this ammonia and the gaseous ammonia in conduit 9, as would cause the gaseous ammonia to condense, can never take place. A small amount of the inert gas may be carried from absorber 38 to generator 10 and thence pass through conduits 18 and 9 into outer conduit 19. As the inert gas is not condensable at the temperature and pressure which exist within rectifier-condenser C it would collect there and form a "gas pocket" unless a vent were provided. For this reason a conduit 21 connects the vapor space of conduit 19 with the space 34 in heat exchanger 22. Inert gas which enters conduit 19 passes therefrom through conduit 21 and thus the formation of a gas pocket is prevented.

The liquid ammonia condensed within rectifier-condenser C collects in pocket 24. As the apparatus is so arranged that pocket 24 is at a higher elevation than the top of gooseneck bend 27 the liquid ammonia will run by gravity from pocket 24 through conduit 23 and gooseneck bend 27 into the upper part of evaporator 28. Within evaporator 28 the ammonia is distributed on disks 29. A gas, inert with respect to ammonia, for instance hydrogen, is introduced into evaporator 28 through conduit 26. The ammonia evaporates in the presence of the hydrogen and a drop in temperature takes place and refrigeration is produced.

As the mixture of ammonia and hydrogen formed within evaporator 28 has a greater specific weight than the hydrogen in conduit 26, the mixture passes downwardly through the apertures 30 in disks 29. The gaseous mixture passes out of evaporator 28 through conduit 33, through space 34 in heat exchanger 22, and through conduit 53 to the lower part of absorber 38.

Within absorber 38 the gaseous mixture of ammonia and hydrogen is brought in intimate contact with water which contains but relatively little ammonia in solution. This water enters the absorber at the top through conduit 51 and passes downwardly over disks 39 and absorbs the ammonia. The greater part of the heat generated by this absorption is carried away by the cooling water in water jacket 40. The hydrogen is not absorbed and passes upwardly through the absorber and through conduit 25 to space 44 in heat exchanger 22. From space 44 the hydrogen passes through tubes 37, space 45, and conduit 26 to evaporator 28, where it once more mixes with ammonia. Within heat exchanger 22 the hydrogen within tubes 37 and the liquid ammonia within conduit 23 are cooled before they enter the evaporator by the gaseous mixture of ammonia and hydrogen in space 34, which mixture has just left the evaporator.

The strong solution of ammonia in water which is formed in the absorber runs by gravity through conduit 48 to auxiliary generator 12. The application of heat to the solution in auxiliary generator 12 causes the formation of vapor in the top thereof. This vapor enters thermo-siphon conduit 16 through one or more of the ports 17 and reduces the specific weight of the column of fluid therein to such an extent that flow takes place upwardly through conduit 16 and the liquid in auxiliary generator 12 is elevated to main generator 11. In main generator 11 the ammonia is again driven out of solution as previously described. The water passes downwardly through main generator 11 and passes out as weak solution, that is, one which contains but relatively little ammonia in solution, through conduit 50 to heat exchanger 49. Within heat exchanger 49 the weak solution gives up heat to the strong solution in conduit 48. From heat exchanger 49 the weak solution passes through conduit 51, is further cooled by the cooling water in water jacket 40, and finally enters the upepr part of the absorber and again absorbs ammonia.

While I have shown the rectifier condenser C as being water cooled, it is to be understood that other cooling means are contemplated, as for instance, by air. In the case of air cooling fins may be added to secure an increased radiating surface and conduit 9 is preferably thermo-connected, as by welding or the like, to outer member 19. Such contact is not generally advisable, however, in the case of a water cooled unit because it might result in condensation of the refrigerant in conduit 9.

While I have shown and described a more or less specific form of my invention, it is to be fully understood that I am not limited thereby except in the light of the appended claims.

I am aware of application Serial No. 132,160 filed August 28, 1926, by Carl Georg Munters and do not claim what is disclosed therein.

Having thus described my invention, what I claim is:

1. In a refrigerating apparatus, a combined rectifier-condenser comprising an inclined hollow member, an inclined conduit extending within said hollow member along the lower portion thereof and having an upper opening permitting vapor in said conduit to pass into said hollow member, means for cooling said member and means for withdrawing liquid from the lower portion of said member.

2. In a refrigerating apparatus, a combined rectifier-condenser comprising an outer inclined cylindrical member, a conduit inclined and extending along the bottom of said cylindrical member, said conduit having an opening outside said member and an opening within said member in the upper portion thereof, means for externally cooling said member and means for withdrawing liquid from the lower portion of said member.

3. In a refrigerating apparatus, a combined rectifier-condenser comprising an outer cylindrical member, an inclined conduit extending along the bottom of said member and having an open upper upturned end permitting vapor in said conduit to pass into said hollow member, means for cooling said member and means for withdrawing liquid from the lower portion of said member.

4. In a refrigerating apparatus, a combined rectifier-condenser comprising an inclined hollow member, an inclined conduit extending within said hollow member along the lower portion thereof and having an upper opening permitting vapor in said conduit to pass into said hollow member, a vent pipe connected to said member, means for cooling said member and means for withdrawing liquid from the lower portion of said member.

In testimony whereof I hereunto affix my signature.

ALVAR LENNING.